United States Patent
Inada et al.

(10) Patent No.: US 7,558,949 B2
(45) Date of Patent: Jul. 7, 2009

(54) DATA PROCESSING APPARATUS AND CONTROL METHOD FOR VERIFYING THAT VERSION CODES IN SELECTED BOOT SECTOR AND MAIN SECTOR MATCH

(75) Inventors: Hironobu Inada, Suwa (JP); Go Hiroike, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 397 days.

(21) Appl. No.: 11/354,540

(22) Filed: Feb. 14, 2006

(65) Prior Publication Data

US 2006/0184781 A1    Aug. 17, 2006

(30) Foreign Application Priority Data

Feb. 16, 2005    (JP)    ............... 2005-039687

(51) Int. Cl.
  *G06F 15/177*    (2006.01)
(52) U.S. Cl. .............................. 713/2; 713/1
(58) Field of Classification Search ............. 713/2, 713/1
  See application file for complete search history.

(56) References Cited

U.S. PATENT DOCUMENTS

| 6,412,082 | B1 | 6/2002 | Matsuura |
| 6,442,067 | B1 | 8/2002 | Chawla et al. |
| 6,684,328 | B2 | 1/2004 | Matsuura |
| 7,318,151 | B1 * | 1/2008 | Harris ........................... 713/2 |
| 2003/0236970 | A1 | 12/2003 | Palmer et al. |
| 2004/0039872 | A1 | 2/2004 | Takamizawa et al. |
| 2006/0070055 | A1 * | 3/2006 | Hodder et al. ............... 717/168 |

FOREIGN PATENT DOCUMENTS

| CN | 1469252 A | 1/2004 |
| EP | 1 265 135 A2 | 12/2002 |
| EP | 1 372 068 A2 | 12/2003 |
| JP | 2002-222093 | 8/2002 |
| JP | 2004-94628 | 3/2004 |
| KR | 19990063139 | 7/1999 |

OTHER PUBLICATIONS

Kirk, et al., "Fully Reprogrammable Fault-Tolerant Flash Memory System", IP.COM Journal, IP.COM Inc., West Henrietta, NY, Aug. 1, 1995.
Capps Jr et al., "Two-Stage Microcode Support using Flash EEPROMS", IP.COM Journal, IP.COM INC., West Henrietta, NY, Jan. 1, 1994.

* cited by examiner

*Primary Examiner*—Thomas Lee
*Assistant Examiner*—Albert Wang (57) ABSTRACT

A data processing apparatus comprising: flash ROM that can communicate with a CPU, the flash ROM comprises a boot sector that stores a boot selector program, a first boot sector and a second boot sector each storing a boot program that is selectively called by the boot selector program. The CPU executes the boot selector program to select the first boot sector or the second boot sector each storing a boot program to be executed. The CPU executes the selected boot program to verify a version code stored in a main sector and the selected boot sector. The CPU executes a main program when the version code in the main sector matches the version code in the selected boot sector.

8 Claims, 8 Drawing Sheets

DATA PROCESSING APPARATUS AND CONTROL METHOD FOR VERIFYING THAT VERSION CODES IN SELECTED BOOT SECTOR AND MAIN SECTOR MATCH

RELATED APPLICATIONS

Japanese patent application No.(s) 2005-039687, is hereby incorporated by reference in its/their entirety.

BACKGROUND OF THE INVENTION

1. Field of the Invention

The present invention relates to a data processing apparatus and to a control method for a data processing apparatus.

2. Description of the Related Art

Data processing apparatuses such as printers and scanners are now used in a wide range of personal and business applications. A printer is used by way of example below as a data processing apparatus.

Firmware disposed inside the printer is run to control printer operation. This firmware broadly includes two types of programs: a boot program that executes a sequence of operations required to start printer operation, including hardware initialization, and a main program that is run after the startup operation of the boot program to control the printer using instructions from a host computer. The boot program and main program are stored in different sectors in flash ROM disposed in the printer, and flash ROM content can be rewritten by sector unit. More specifically, the boot program and main program can be separately updated by overwriting the sectors storing the boot program and main program in flash ROM.

If writing the sectors where the boot program is stored (the "boot sectors") fails, however, the printer cannot execute the startup process controlled by the boot program, and the printer is thus rendered unable to start operation. To avoid this problem, Japanese Unexamined Patent Appl. Pub. 2004-94628 teaches a double boot method whereby a plurality of selectively read boot sectors are provided so that if rewriting the boot program stored in one boot sector fails, the program can start up using the normal boot program stored in the other boot sector.

If writing to one of the two sectors used for this double boot function fails when simultaneously overwriting both the boot program and main program in a printer having this double boot function, the overwrite procedure could result in only the main program being overwritten while writing the boot program failed. The next time the power is turned on after this happens, the printer will boot using the older version of the boot program stored in the one boot sector where overwriting did not fail, and the new version of the main program stored in the main sector that was correctly overwritten then runs. Because the printer operates normally when this happens the user may wrongly think that the double boot sectors were correctly rewritten. The printer may sometimes boot normally and operate without any problem when this happens, but the problems addressed by upgrading the firmware are not actually corrected, and the printer may continue operating while containing a fatal firmware error.

OBJECTS OF THE INVENTION

The present invention is directed to solving this problem, and an object of the invention is to provide a data processing apparatus and a control method for a data processing apparatus that selects one of the next double boot sectors if the boot program that is executed immediately after the printer power turns on is stored in a non-rewritable boot sector and the printer starts operating from the boot sector, which area is not overwritten. In addition, a boot program of the same version name as the main program stored in the main sector is also stored in the double boot sectors, and the version names in the main sector and boot sector are compared to determine if the double boot sector and main sector were both correctly overwritten.

SUMMARY OF THE INVENTION

To achieve this object, a data processing apparatus according to a first embodiment of the present invention has a CPU; and flash ROM that can communicate with the CPU and has a plurality of sectors. Flash ROM in the context of the current invention refers to any and all forms of non-volatile memory. The flash ROM comprises: a boot selector that stores a boot selector program; a first boot sector and a second boot sector each storing a boot program that is selectively called by the boot selector program; and a main sector that stores a main program activated by the boot program. The CPU executes the boot selector program to select the first boot sector or second boot sector storing the boot program to be executed, then executes the selected boot program to verify a version code stored in the main sector and either the first boot sector or second boot sector, and then executes the main program if the version code in the main sector is verified to match the version code stored in either the first boot sector or second boot sector.

In a data processing apparatus according to a second embodiment of the invention, the CPU comprises an overwrite processor unit for performing a flash ROM write process, and performs the flash ROM write process when the version code of the main sector and the version code of the boot sector selected by the boot selector program are confirmed to not match.

A third embodiment of the invention is a control method for a data processing apparatus comprising flash ROM having a boot selector that stores a boot selector program, first and second boot sectors each storing a version code, data update count, and checksum, and a main sector storing a version code. The control method comprises: a boot sector selection step of selecting the first boot sector or second boot sector by running the boot selector program; and a version code verification step of verifying if the version code in the main sector matches the version code stored in the first boot sector or second boot sector. The main program stored in the main sector is run if the version code in the main sector matches the version code of the boot sector selected by the boot sector selection step.

In a data processing apparatus control method according to a third embodiment of the invention, the version code verification step performs the flash ROM write process if the version code of the main sector and the version code of the boot sector selected by the boot selector selection step are confirmed to not match.

A data processing apparatus control method according to a fifth embodiment of the invention also has a main sector verification step of verifying the main sector checksum for confirming the integrity of the main data stored in the main sector. In this embodiment of the invention the main program executes if the version code in the main sector matches the version code of the boot sector selected by the boot sector selection step and the main sector verification step verifies that the main sector checksum is correct.

In a data processing apparatus control method according to a sixth embodiment of the invention, the first boot sector and second boot sector also each store a data update count for comparing the age of content stored in the first boot sector and second boot sector, and a checksum and boot ID for verifying the integrity of the boot programs stored in the first boot sector and second boot sector.

In a data processing apparatus control method according to a seventh embodiment of the invention the boot sector selection step comprises: a boot sector checksum verification step for verifying the checksum of each boot sector; and an update count comparison step of comparing the first boot sector update count and the second boot sector update count.

In a data processing apparatus control method according to an eighth embodiment of the invention the boot program from the first boot sector executes if the boot sector checksum verification step verifies the first boot sector checksum and the second boot sector checksum are both correct, and the update count comparison step determines the update count of the first boot sector is greater than the update count of the second boot sector; and the boot program from the second boot sector executes if the update count of the second boot sector is greater than the update count of the first boot sector.

When the printer power turns on or is reset, the invention runs the main program only if the version code stored in the first boot sector and main sector match or the version code stored in the second boot sector and main sector match. Whether the main program and boot program were both updated and written correctly can therefore be easily and reliably verified when updating the printer firmware.

The invention can also run the boot program updating process again after the boot selector program runs if writing the boot program to the first boot sector or the second boot sector failed for some reason but writing the main program in the main sector succeeded. As a result, after running the boot process using the boot program stored in the first or second boot sector containing the old version code, that is, the boot sector that was not addressed by the firmware updating process, the main program that was updated and is identified by the new version code will not be executed. This avoids problems resulting from the printer firmware not being updated due to a version code mismatch when the printer boots up again.

The invention can also reliably determine if the main program was correctly overwritten and updated because the updated main program runs only if the checksum of the main sector is correct after the main program is overwritten.

Furthermore, the main program from before the program was updated will not run if overwriting the main program fails because the process for writing and updating the main program runs again, and the invention thus assures that the printer is always driven using the most recent main program.

Yet further, even if there is an error in the first boot sector or second boot sector, the printer can still boot from the other, normal, boot sector.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Preferred embodiments of a data processing apparatus and control method for a data processing apparatus according to the present invention are described below with reference to the accompanying figures.

Figure 1:
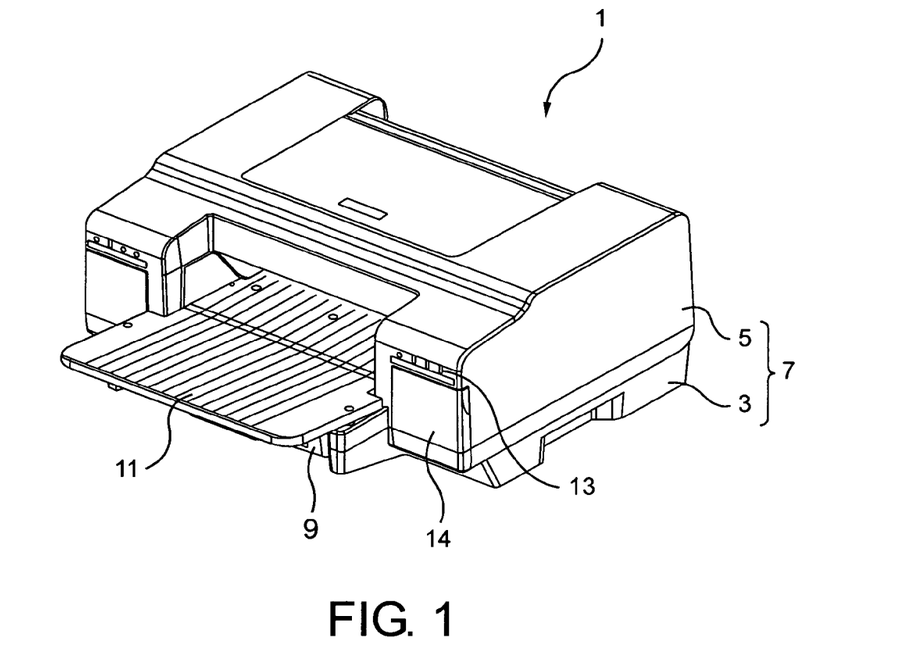
FIG. 1 is an oblique view of a printer according to a preferred embodiment of the invention.

FIG. 1 is an oblique view of a printer 1 according to this embodiment of the invention.

As shown in FIG. 1, a substantially box-shaped paper cassette 9 for holding paper is freely removably installed in the front middle part of the printer case 7 of this printer 1. The printer case 7 is composed of a bottom case member 3 and a top case member 5. A discharge tray 11 for receiving the printed paper is disposed above the paper cassette 9.

Display units 13 for displaying the operating status of the printer are disposed on both sides at the front of the printer case 7, and an ink storage unit 14 for holding an ink cartridge is rendered below the display units 13. Rendered inside the printer case 7 are a transportation mechanism for conveying paper or other printing medium one sheet at a time from the paper cassette 9 through a predetermined transportation path, and various operating devices and a recording unit are disposed at positions along the transportation path for recording images of text or graphics, for example, on the paper being conveyed, thereby printing on the paper.

The arrangement of the control unit disposed in the printer 1 according to this embodiment of the invention is described next.

Figure 2:
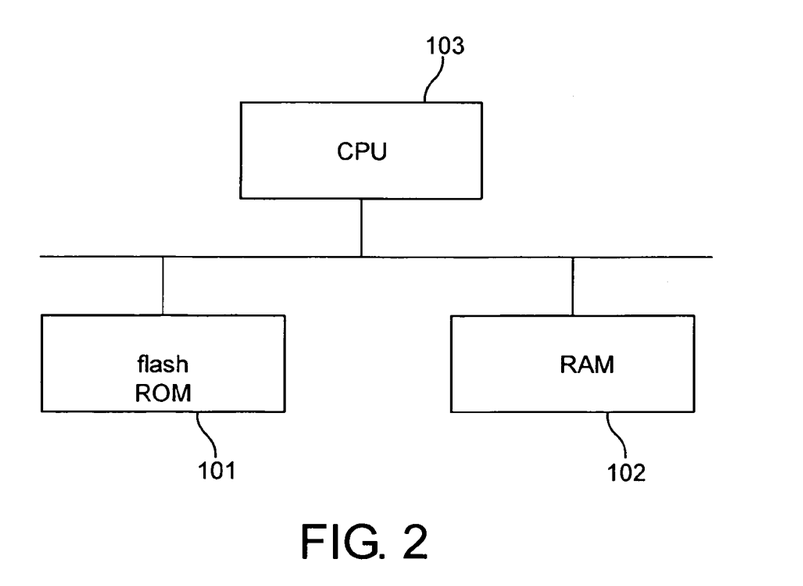
FIG. 2 shows the hardware arrangement of a printer according to the present invention.

FIG. 2 shows the arrangement of an exemplary control unit in a printer 1 according to this embodiment of the invention.

This printer 1 has flash ROM 101 or other type of nonvolatile memory device, RAM 102 or other type of volatile storage, and a CPU 103 as an operating unit.

The flash ROM 101 is divided into a plurality of sectors as the smallest writable area that can be erased at one time, and programs can be rewritten by sector unit. This flash ROM 101 stores a boot selector program that controls the operations performed at the beginning of the boot process, a boot program that then takes over from the boot selector program and continues the boot process, and a main program that controls printer 1 operations during the normal operating mode.

Note that the sector of the flash ROM 101 storing the boot selector program is called the "boot selector" below, the sector storing the boot program is called the "boot sector," and the sector storing the main program is called the "main sector."

RAM 102 is the storage area where data is stored temporarily. The CPU 103 reads data from RAM 102 while running the programs stored in flash ROM 101 in order to control the printer 1.

Figure 3:
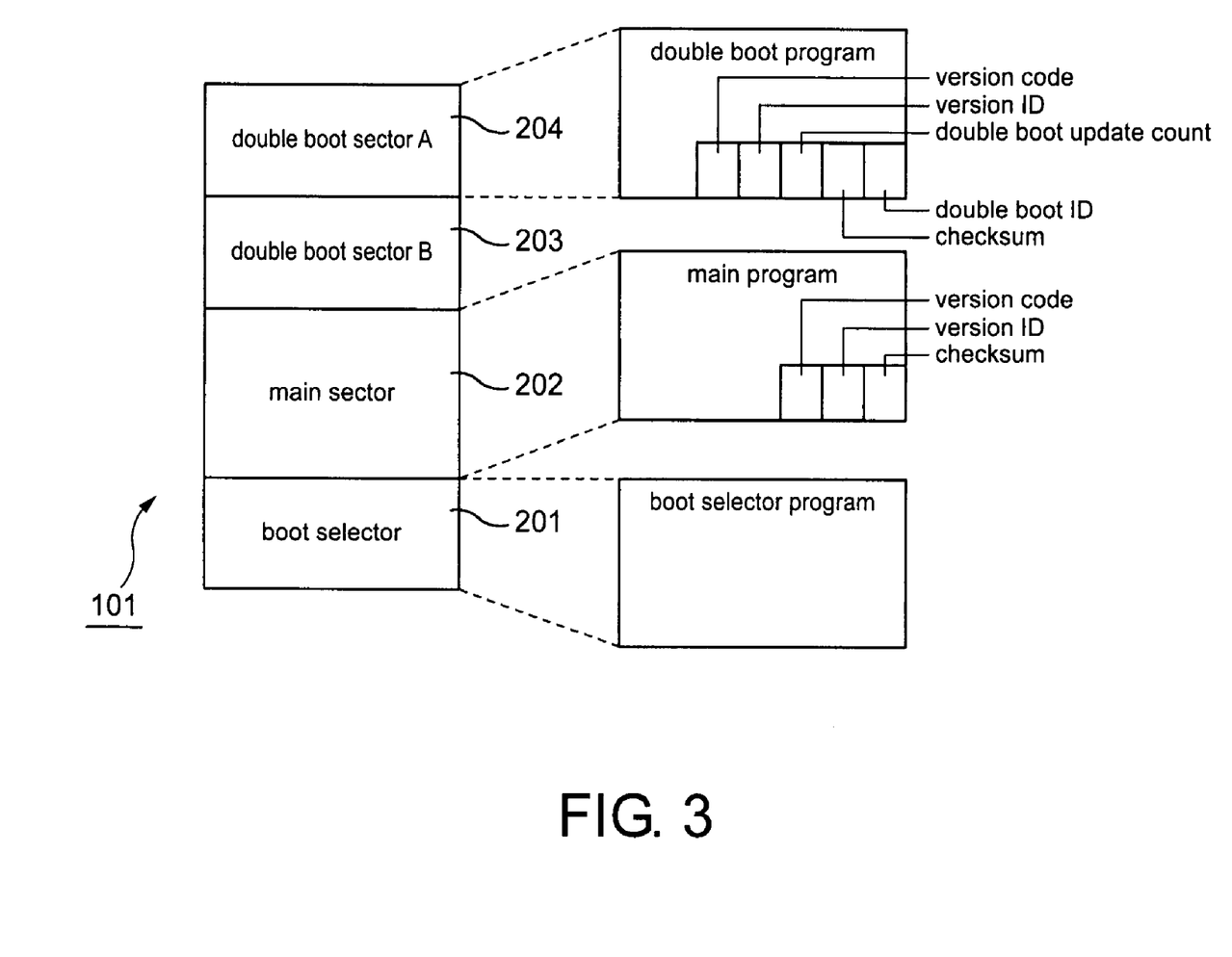
FIG. 3 shows the sector arrangement of the flash ROM.

FIG. 3 shows a preferred arrangement of the sectors in flash ROM 101.

The flash ROM 101 is functionally divided into the boot selector 201, main sector 202, a first boot sector (double boot sector A) 204, and a second boot sector (double boot sector B) 203. Double boot sector A 204 and double boot sector B 203 are also collectively referred to as the "double boot sector" below, and the program written to the double boot sector is called the "double boot program."

The boot selector 201 is described first.

The boot selector 201 stores the boot selector program that is read and run first when the printer 1 turns on. The boot selector program consists of an initial boot program that controls the initial boot process when the printer 1 power turns on, and a boot selector program that is run after the initial boot process is completed in order to select whether to read the boot program from double boot sector A 204 or double boot sector B 203. The boot selector program is basically designed so that it cannot be rewritten, controls the minimum essential functions that are required for the printer 1 to start up, and then selects whether to run the boot program from double boot sector A 204 or double boot sector B 203.

The minimum essential functions controlled by the boot selector program include, for example, a minimal hardware check and initialization. This minimal hardware check and initialization includes, for example, checking and initializing only those devices that are required for the boot selector program to operate until the double boot program is run from the double boot sector as further described below, and thus includes checking and initializing the CPU 103 and a predetermined area in RAM 102 that is needed to run the boot selector program.

The boot selector program is written using the simplest code possible in order to absolutely minimize the need to rewrite the content of the boot selector 201 to fix bugs. Although not shown in the figures, a version code identifying the version of the flash ROM content, and a version ID for authenticating the version code, can also be stored in the boot selector 201. For brevity below, this embodiment of the invention assumes that the boot selector program is bug free and the boot selector program therefore cannot be overwritten.

Double boot sector A 204 and double boot sector B 203 are described next.

Double boot sector A 204 stores a boot program for performing various startup processes when the printer boots up, and controls the function for rewriting the programs stored in flash ROM 101. More specifically, the boot program consists of a boot program for running the boot processes that are required to completely start printer 1 operation, a main transition program that runs after the boot program ends to pass control to the main program stored in the main sector 202, and an overwrite program for overwriting programs in flash ROM 101.

The boot program stored in double boot sector A 204 independently initializes and checks from the beginning all devices required to start the printer 1, including all of the devices initialized and checked by the initial boot program stored in the boot selector 201 as described above. More specifically, for example, this boot program checks the CPU and RAM, identifies the communication interface and then runs the processes needed to enable the communication interface, and runs processes for handling status requests.

Identically to double boot sector A 204, double boot sector B 203 stores a boot program for performing various startup processes when the printer boots up, and controls the function for rewriting the programs stored in flash ROM 101. As does the boot program stored in double boot sector A 204, this boot program more specifically consists of a boot program for running the boot processes that are required to completely start printer 1 operation, a main transition program that runs after the boot program ends to pass control to the main program stored in the main sector 202, and an overwrite program for overwriting programs in flash ROM 101.

Except for the update count, the boot program written to double boot sector B 203 at factory shipping is identical to the boot program written to double boot sector A 204. If the boot program is updated and thus overwritten at any time after shipping, the boot program is alternately written to double boot sector B 203 and double boot sector A 204, and different versions of the boot program are therefore stored in double boot sectors A and B after the boot program is first updated.

More specifically, except for when the printer is shipped from the factory, a different version of the boot program executing the same startup functions is stored in double boot sector B 203 and double boot sector A 204.

Also stored in double boot sector B 203 and double boot sector A 204 are a checksum for verifying if the boot program was correctly stored in the respective boot sector, a double boot update count denoting how many times double boot sector A 204 and double boot sector B 203 have each been overwritten, a double boot ID indicating which boot program (boot sector) to read, a version code, and a version ID.

The boot selector program selectively reads and passes control to the boot program stored in double boot sector A 204 or double boot sector B 203 after the boot selector program stored in boot selector 201 runs. This is further described below.

As indicated in FIG. 3, the double boot sector update count, checksum, and double boot ID are preferably written to the end of the double boot sector in the following order: sector update count, checksum, and double boot ID. If these values are written in a different order, the double boot ID is preferably written last in order to even slightly improve the reliability of the double boot sector normalcy check.

Furthermore, the double boot update count, checksum, and double boot ID are preferably 16-bit words. If a different word size is used, the checksum and double boot ID combined are preferably 32 bits or more in order to prevent a drop in the reliability of the normalcy check due to using fewer bits. The update count is also preferably at least 16 bits long to prevent the update counter from cycling.

The main sector 202 is described next.

The main sector 202 stores a main program for controlling printer 1 operation in the normal operating mode, a double boot sector selection program for calling the overwrite program in the double boot sector specified by the host computer, font data, configuration data, and other data used by the main program. The main program stored in main sector 202 is read and run after the boot program stored in double boot sector A 204 or double boot sector B 203 runs, and controls the printer 1 during normal operation.

The main sector 202 is written by the write program portion of the boot program that is stored in the double boot sector A 204 or double boot sector B 203 selected by the boot selector program. The main sector 202 also stores a version code and version ID, and a checksum for verifying the integrity of the main program.

The version code and version ID written in each sector are further described below. The version code written to either double boot sector B 203 or double boot sector A 204 is always the same as the version code written to the main sector 202. This assures that when the printer 1 boots normally, the version code in the main sector 202 and the version code in the sector from which the double boot program was read are always the same. If the version code in the main sector 202 shows that the main program and the double boot program are the same version, the main program and one of the double boot programs are known to have been correctly written by the overwrite process described below, and the main program stored in the main sector 202 can run. This is further described below.

The version code and version ID are preferably written to a fixed address in the boot selector 201 so that the main program in the main sector 202 and the double boot program in the selected double boot sector can reference the version code of the boot selector 201.

Figure 4:
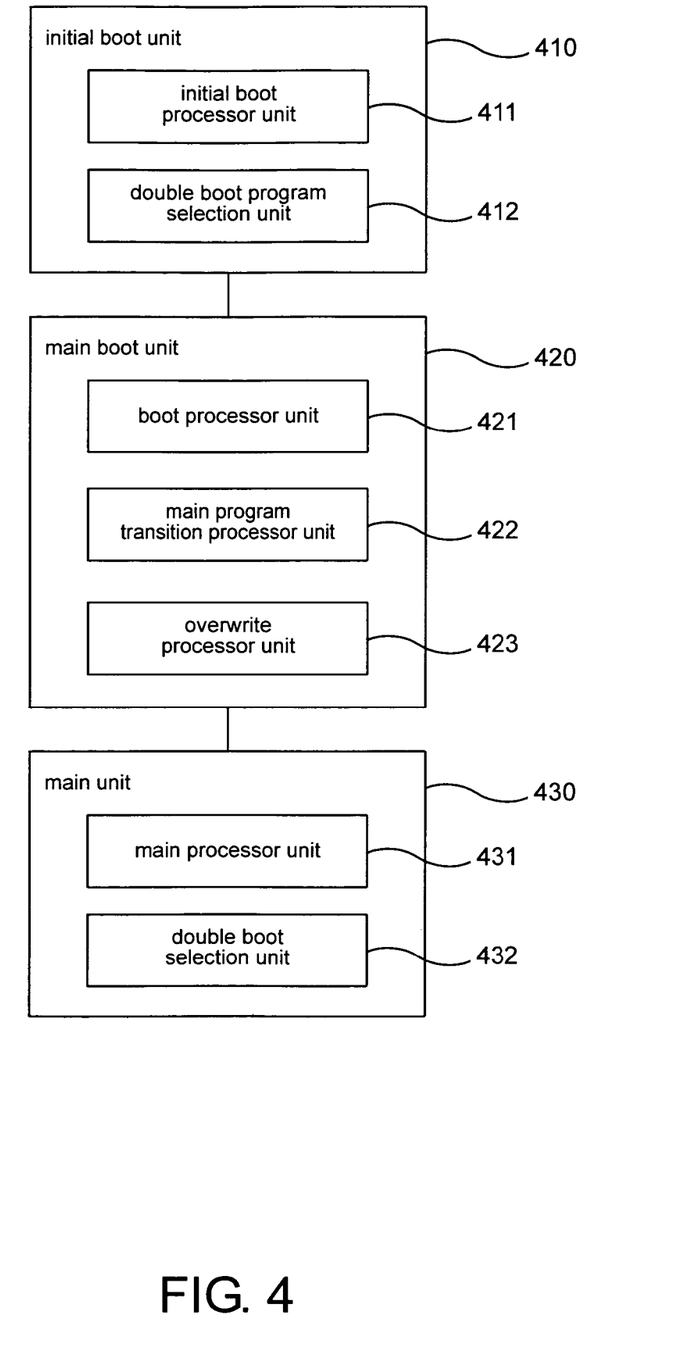
FIG. 4 is a block diagram of the CPU in a printer according to the present invention.

The function units implemented by the CPU 103 running programs from flash ROM 101 are described next below with reference to FIG. 4, a schematic block diagram showing the processes of the CPU 103 in the printer 1 according to this embodiment of the invention.

The CPU 103 consists of an initial boot unit 410, a main boot unit 420, and a main unit 430 which are rendered by the CPU 103 reading and running programs from flash ROM.

The initial boot unit 410 is a function unit that is rendered by reading and running the boot selector program from boot selector 201. By running the initial boot program, the initial boot unit 410 renders an initial boot processor unit 411 and a double boot program selection unit 412. The initial boot processor unit 411 handles the initial startup process immediately after the printer 1 power turns on. As a result of running the boot selector program, the double boot program selection unit 412 then selects whether to read the boot program from double boot sector A 204 or double boot sector B 203 after the initial boot program ends.

Figure 8:
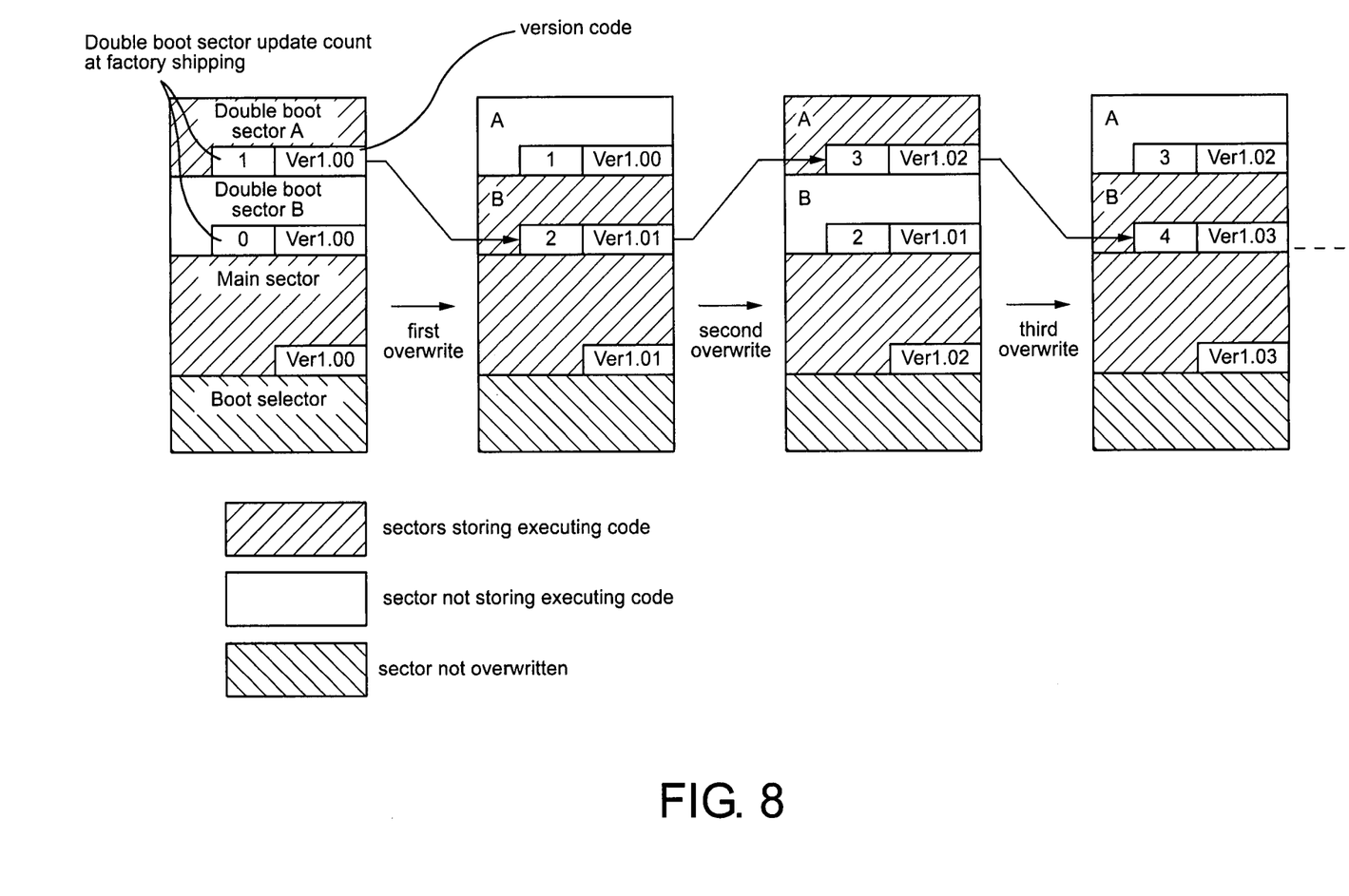
FIG. 8 illustrates the flash ROM overwrite process.

The double boot program selection unit 412 determines if the checksum of double boot sector A 204 or double boot sector B 203 is correct and then compares the double boot update counts to determine whether to read the boot program from double boot sector A 204 or double boot sector B 203. The double boot program selection unit 412 runs an error handling process if the checksum is incorrect for both double boot sectors. If, for example, the update count of double boot sector A 204 is set to 1 and the update count of double boot sector B 203 is set to 0 as shown in FIG. 8, the double boot program selection unit 412 first selects double boot sector A 204.

The main boot unit 420 is a function unit that is rendered by reading and running the boot program from either double boot sector A 204 or double boot sector B 203. The main boot unit 420 consists of a boot processor unit 421, a main program transition processor unit 422, and a overwrite processor unit 423.

The boot processor unit 421 runs a boot program to perform the boot processes required to enable complete use of the printer 1. The main program transition processor unit 422 runs the main transition program to pass control to the processes of the main program, which is stored in main sector 202 and runs after the boot program has been executed. The overwrite processor unit 423 runs a write program for overwriting the program contents in the flash ROM 101.

The main program transition processor unit 422 determines whether to read and run the main processes of the main program stored in main sector 202 after the boot processor unit 421 finishes the boot process. More specifically, the main program transition processor unit 422 determines if the version code stored in the double boot sector that stores the double boot program that is being currently read and run matches the version code stored in the main sector 202. The same version code is written to both the double boot sector and the main sector 202 when the program is updated, and the double boot program stored in the double boot sector identified by the most recent version code is read and run so that the version code of the boot program always matches the version code of the main program when shifting to the main program.

If the version codes in both sectors match and the checksum of the main sector 202 is verified correct, the main program written in the main sector 202 is read and operation continues under the main program. If the checksum test fails, the main program transition processor unit 422 passes control to the overwrite processor unit 423.

If the boot program cannot be read from the double boot sector storing the most recent version of the double boot program for any reason, the double boot program is read and run from the other of the two double boot sectors, that is, the double boot sector storing the older version of the double boot program, and control then passes to the main program, the version code from the active double boot sector will not match the version code of the main program. In this situation, the main program transition processor unit 422 passes control to the overwrite processor unit 423.

The overwrite processor unit 423 then overwrites the double boot program in the double boot sector from which the double boot program could not be read, and the main program in the main sector 202. The overwrite program stored in one double boot sector therefore controls writing the other double boot sector in this embodiment of the invention. Therefore, even if writing the other double boot sector fails for some reason, the program code in the first double boot sector will still operate normally because it has not been changed, and the printer is therefore assured of always being able to maintain a usable boot program in at least one double boot sector.

After overwriting the program content, the overwrite processor unit 423 updates the checksum value calculated from the updated double boot program and the updated main program, respectively, and writes a value calculated from the update count of the double boot sector that was selected by the double boot program selection unit 412 as the update count of the unselected double boot sector. Each time the write process runs, the same version code is also written to the main sector 202 and the unselected double boot sector that was overwritten with new content.

The main unit 430 consists of a main processor unit 431 and a double boot selection unit 432. The main processor unit 431 runs the main program while referencing font data, configuration settings, and other data to control operation of the printer 1 in the normal printing mode. The double boot selection unit 432 is activated by an overwrite command sent from the host computer.

The main processor unit 431 is a function unit for controlling the drive units of the printer 1 while communicating with the host computer, and controlling the normal printing operation. Unless the printer 1 has entered an overwrite mode to update ROM content, control is always passed to this main processor unit 431 after the boot process ends to control driving the printer 1.

If an overwrite command sent from the host computer is received during processing by the main processor unit 431, the double boot selection unit 432 decides whether to activate the overwrite processor unit 423 in order to overwrite the flash ROM based on the received overwrite command. The selection algorithm used by this double boot selection unit 432 is the same selection algorithm used by the double boot program selection unit 412 of the initial boot unit 410. More specifically, if an overwrite command is received while the main unit 430 is operating, this embodiment of the invention directly selects the double boot program from the double boot sector without rebooting, and enters the overwrite mode.

Figure 5:
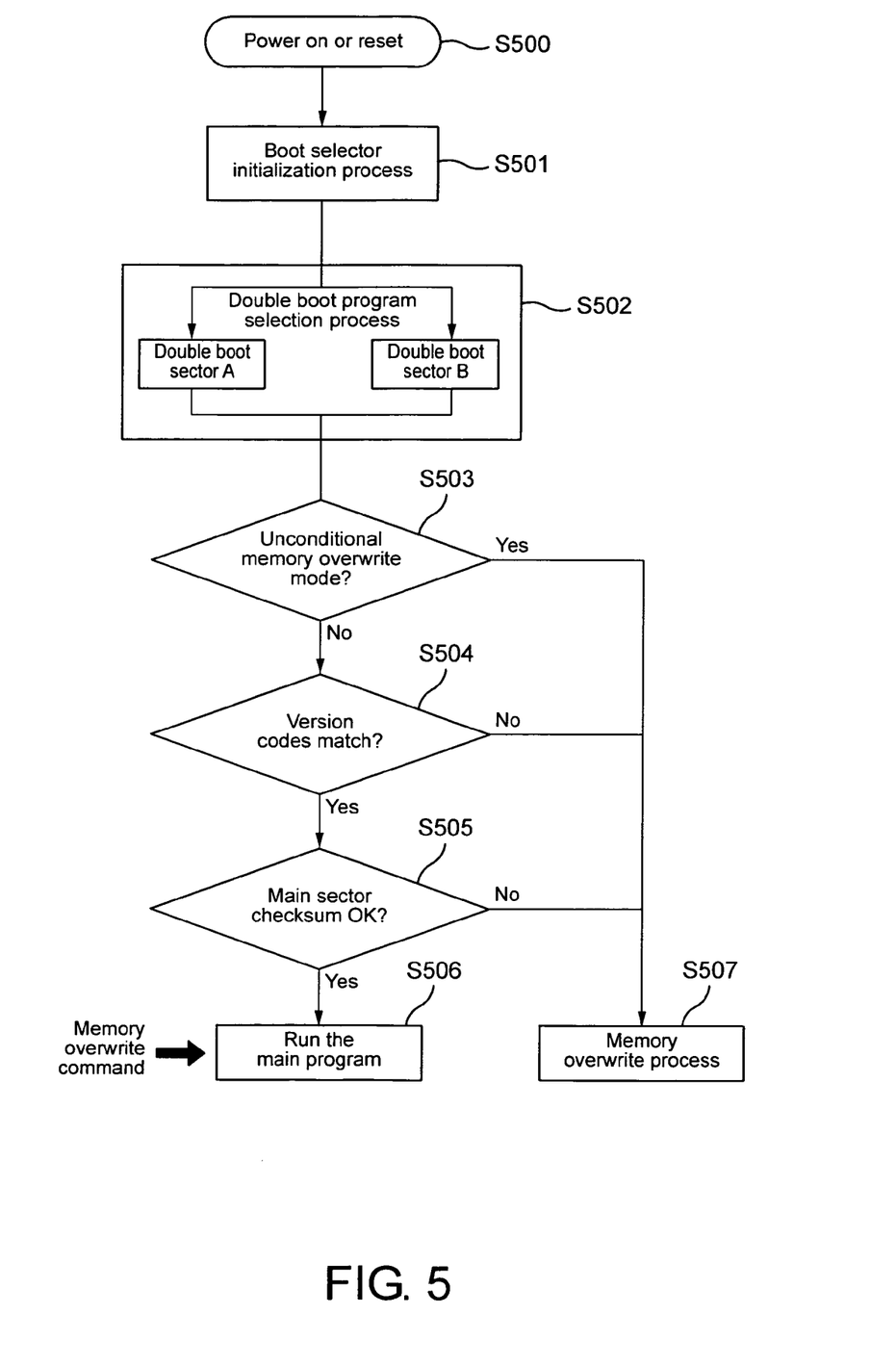
FIG. 5 is a flow chart showing the version checking method of the present invention.

The startup operation (boot process) of a printer 1 according to this embodiment of the invention is described next below. FIG. 5 is a flow chart showing the boot process of this printer 1.

When the printer 1 power turns on or is reset (step S500), the boot selector program is read from the boot selector 201 and run to initialize the CPU 103, RAM 102, and other essential devices as described above (step S501).

The boot selector program thus runs and passes control to the double boot program selection process (step S502). This double boot program selection process is the selection process for choosing either double boot sector A 204 or double boot sector B 203 to run the main program stored in main sector 202. This double boot program selection process is described in detail below with reference to FIG. 6.

The state of a DIP switch (not shown) disposed in the printer 1 is then read to determine if the "unconditional overwrite mode" is set (step S503). If the DIP switch is set so that this unconditional overwrite mode is active (step S503 returns Yes), the overwrite program is activated to overwrite the content of flash ROM 101 (step S507). If the unconditional overwrite mode is not active (step S503 returns No), the version code of the double boot sector selected in the double boot program selection process (step S502) is compared with the version code read from the main sector 202 (step S504).

If the version codes do not match (step S504 returns No), the memory overwrite process is run unconditionally (step S507). If the version codes match, the checksum of the main sector 202 is verified (step S505).

If the checksum test of the main sector 202 fails, the memory overwrite process runs (step S507). If the checksum is verified, the main program stored in the main sector 202 runs and the printer can be used for printing and other predetermined operations. All devices in the printer 1 can be driven in this situation, and the printer 1 can operate normally according to commands received from the host computer (step S506).

Figure 6:
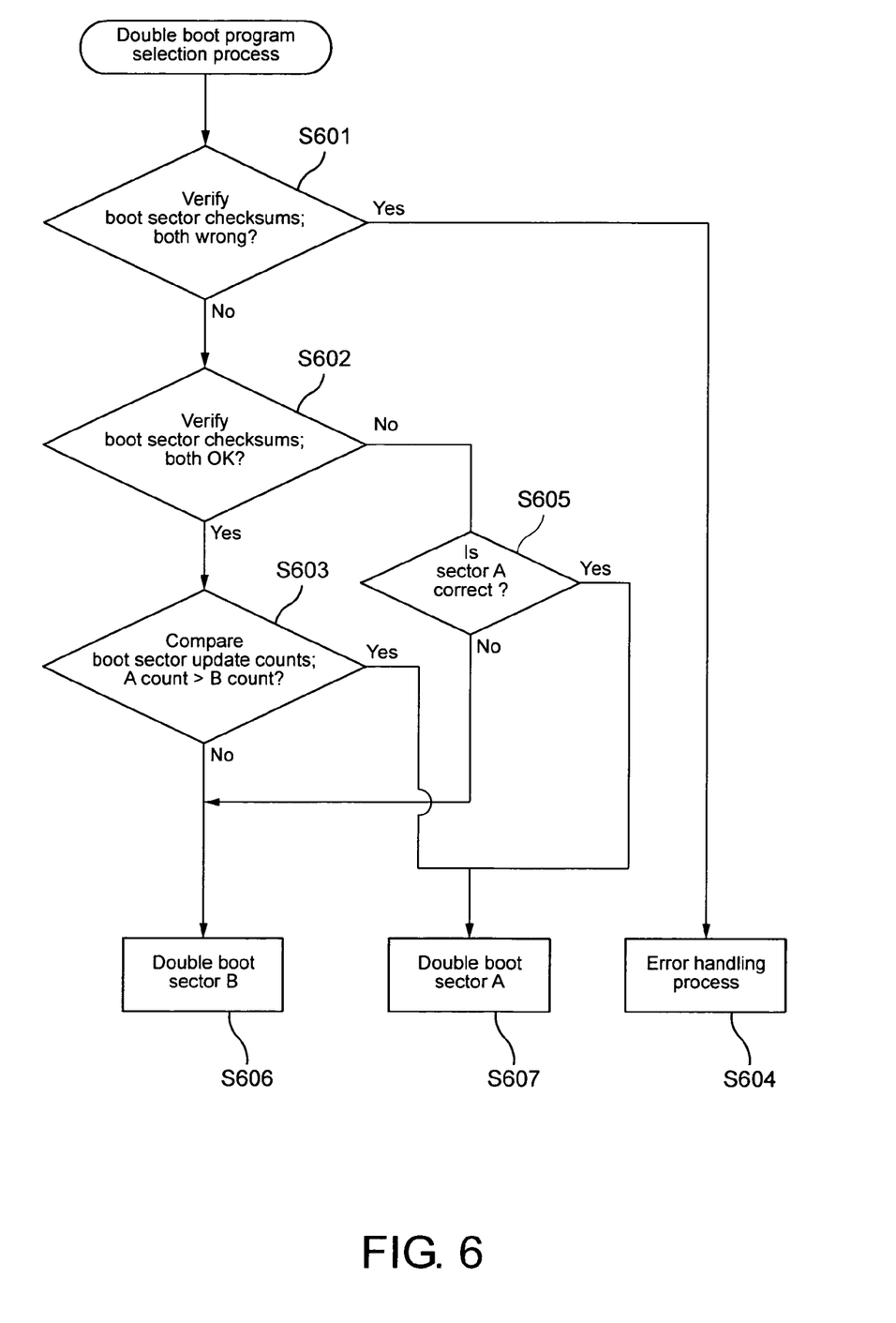
FIG. 6 is a flow chart of the double boot program selection process in a printer according to the present invention.

The double boot program selection process run by the boot selector program is described below. FIG. 6 is a flow chart of this double boot program selection process of the printer 1 according to this embodiment of the invention.

The double boot program selection unit 412 first verifies if the checksum is wrong in both double boot sector A 204 and double boot sector B 203 (step S601). If the checksum is wrong for both double boot sector A 204 and double boot sector B 203 (step S601 returns Yes), the error handling process of the boot selector program stored in the boot selector 201 assumes control (step S604).

If the checksum is correct for at least one of double boot sector A 204 and double boot sector B 203 (step S601 returns No), whether the checksum is correct for both double boot sector A 204 and double boot sector B 203 is determined (step S602). If the checksum is correct for both double boot sector A 204 and double boot sector B 203 (step S602 returns Yes), the double boot update counts of double boot sector A 204 and double boot sector B 203 are compared (step S603).

The update counts recorded in double boot sector A 204 and double boot sector B 203 are updated each time the double boot sector is written. More particularly, the double boot update count of the double boot sector being written is incremented by 1 and the result is stored as the new double boot update count in the double boot sector being written. Which double boot sector contains the newest double boot program can therefore be determined by comparing these update counts. See FIG. 8.

Therefore, if the double boot update count in double boot sector A 204 is higher, double boot sector A 204 is identified as the most recently written (updated) boot sector, and double boot sector A 204 is therefore selected as the boot sector from which to read and run the boot program (step S607). However, if the update count of double boot sector B 203 is higher, double boot sector B 203 is the most recently updated boot sector, and double boot sector B 203 is therefore selected as the boot sector from which to read and run the boot program (step S606).

However, if the checksum is wrong for either double boot sector A 204 or double boot sector B 203 (step S602 returns No), the checksum for double boot sector A 204 is checked again (step S605). If the checksum of double boot sector A 204 is correct (step S605 returns Yes), double boot sector A 204 is selected as the boot sector from which to read and run the boot program (step S607). However, if the checksum of double boot sector A 204 is wrong (step S605 returns No), double boot sector B 203 is selected as the boot sector from which to read and run the boot program (step S606). This assures that at least one double boot sector operates normally insofar as the checksum is correct for either double boot sector, and the boot process can continue using the boot program read from the double boot sector for which the checksum is correct.

Figure 7:
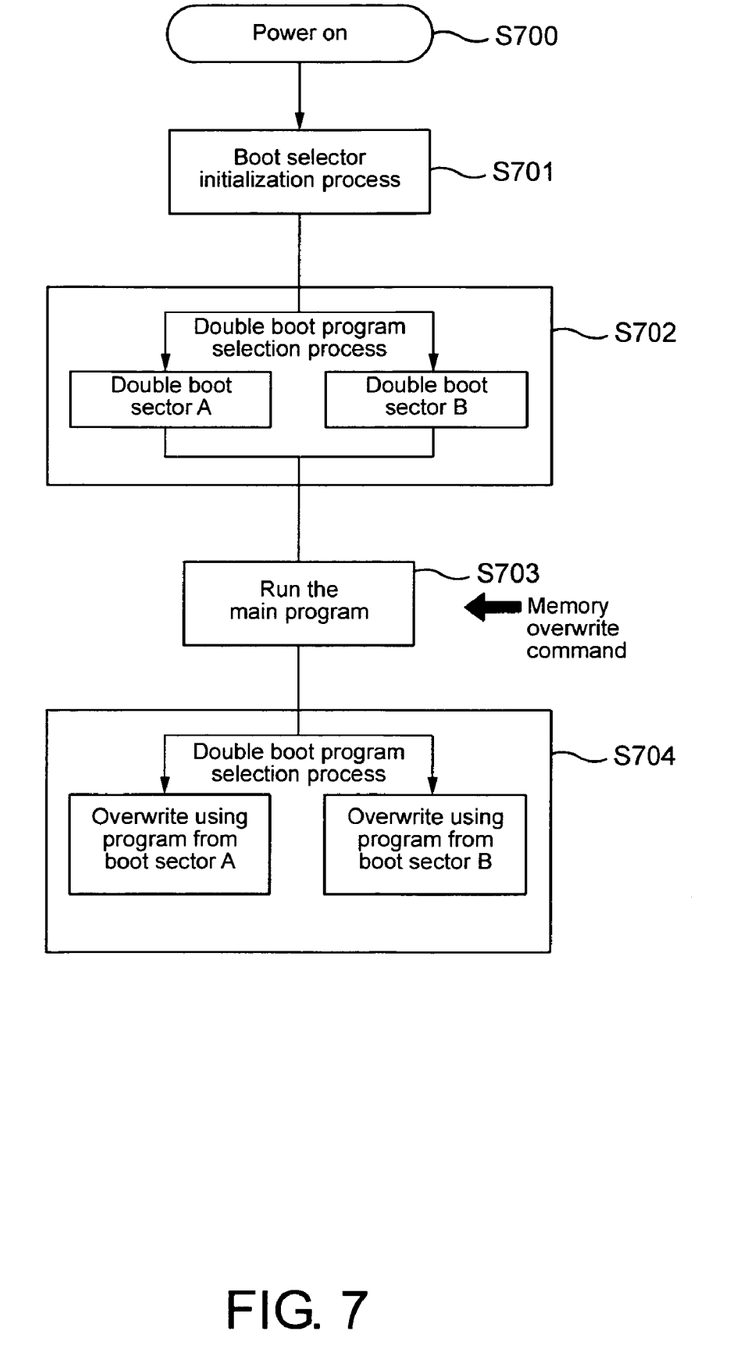
FIG. 7 is a flow chart of the process according to the present invention for going from the normal operating mode to the memory overwrite mode.

In the operation described above, the memory overwrite mode is entered and the overwrite program is run selectively during execution of the double boot program as shown in FIG. 5. The memory overwrite mode can also be activated as desired in response to a command asserted during the normal processing mode of the main processor unit 431 in the main unit 430. FIG. 7 is a flow chart showing the transition from the normal mode to the memory overwrite mode in a printer 1 according to this embodiment of the invention.

When the printer 1 power turns on (step S700), the initial boot program runs and the CPU 103, RAM 102, and other devices are initialized as described above (step S701). The boot selector program then passes control to the double boot program selection process (step S702). This double boot program selection process is the process described with reference to FIG. 6 above. The double boot program stored to double boot sector A 204 or double boot sector B 203 is thus selectively read and the boot process runs (step S702). After then verifying the version codes in the main sector and boot sector, the main program stored in main sector 202 runs and operation continues in the normal operating mode (step S703).

If the printer 1 receives a memory overwrite command from the host computer while the main program is running in the normal operating mode, the double boot program selection unit 412 is activated by the double boot program selection program and the double boot program selection process runs as described with reference to FIG. 6. The memory overwrite program in the boot program stored in the selected double boot sector then starts and flash ROM 101 is overwritten.

The relationship between writing the flash ROM 101 and the update count is described in further detail below.

FIG. 8 shows the change in the flash ROM each time the ROM is written.

When shipped from the factory, the double boot update counts in double boot sector A 204 and double boot sector B 203 of flash ROM 101 are initialized so that the update count is 1 in one double boot sector and 0 in the other double boot sector, and the same version code is written to double boot sector A 204, double boot sector B 203, main sector 202, and boot selector 201. In this embodiment of the invention the double boot update count is initialized to 1 in double boot sector A 204, 0 in double boot sector B 203, and the version code "Ver1.00" is written to each sector.

If the double boot program selection process determines that the checksum is correct for double boot sector A 204 and double boot sector B 203, the boot program is run from the double boot sector having the higher update count. The boot program is therefore run from double boot sector A 204 in this example because the double boot sector A 204 is initialized with a higher count before shipping.

When the overwrite program runs, the boot program read from the selected double boot sector runs and controls overwriting the boot program in the double boot sector that was not selected, and the update count and version code are both updated. In this embodiment of the invention the version code of the main program is also overwritten whenever one of the double boot sectors is written. The version code of the main sector 202 and the version code of the double boot sector being written are updated at the same time and the same version code is written to both.

In this example the overwrite program runs from double boot sector A 204, the unselected double boot sector B 203 is therefore written, and the update count is updated from 0 to 2 and the version code is updated from "Ver1.00" to "Ver1.01." As a result, the update count of the double boot sector being written thus becomes greater than the update count of the double boot sector from which the program is running. The version code stored in the main sector 202 is also updated from "Ver1.00" to "Ver1.01."

The second time the boot sector is overwritten the boot program is run from double boot sector B 203 because the update count read from double boot sector B 203 is now higher than the update count from double boot sector A 204. The program read from double boot sector B 203 therefore controls writing to double boot sector A 204, and updates the update count from 1 to 3 and the version code from Ver1.00 to Ver1.02. The main program stored in main sector 202 is also simultaneously updated and the version code in the main sector 202 is updated from Ver1.01 to Ver1.02.

This same process repeats the third and subsequent times the overwrite process runs. If the update count is the highest allowable value (FFFFh times for word size), the next update count cycles to 0 where 0 is determined to be greater than the maximum allowable value when compared. In this example, therefore, the update count reverts to the default shipping value after memory has been written 10000 h times.

The relationship between writing flash ROM 101 and the processes performed after writing flash ROM 101 is described further below.

Figure 9:
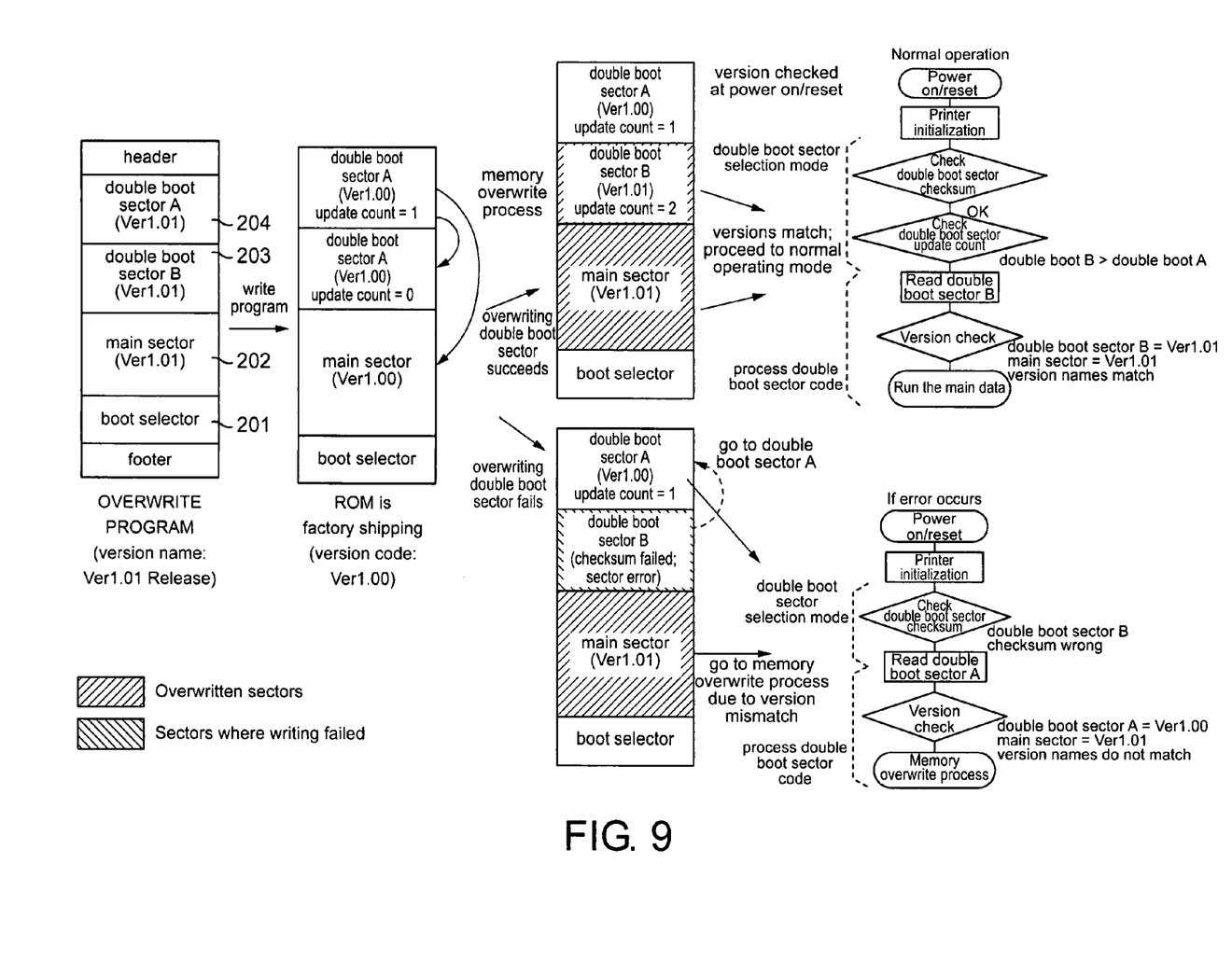
FIG. 9 shows the mode transition when writing the double boot sector succeeds and when writing fails.

FIG. 9 shows the modes activated when writing the double boot sector fails and when writing is successful.

\* When writing the double boot sector succeeds

At shipping, the flash ROM is initialized in this embodiment of the invention so that the double boot update count is 1 in double boot sector A 204 and 0 in double boot sector B 203, and the version code is Ver1.00.

When the overwrite process runs, double boot sector B 203 is successfully written, and the printer 1 power is turned on again or reset, the double boot program selection process that runs after the initial boot process selects double boot sector B 203 because the update count of double boot sector B 203 is higher than the update count of double boot sector A 204 as a result of double boot sector B 203 being written.

When it is verified that the version code was updated from Ver1.00 to Ver1.01 in both double boot sector B 203 and main sector 202 by the overwrite process, processing by the main program stored in main sector 202 continues after the printer 1 is booted by the boot program in double boot sector B 203. In other words, when the overwrite process is successful, the normal boot process ends after verifying that the version code of the main program matches the version code in the overwritten double boot sector B 203 and both sectors were written at the same time.

\* When writing the double boot sector fails If the memory overwrite process runs and writing main sector 202 succeeds but writing double boot sector B 203 fails, a memory failure will be detected in double boot sector B 203 the next time the printer 1 turns on or the power is reset. In this situation, the double boot program selection process selects double boot sector A 204.

In this situation the version code in double boot sector A 204 remains Ver1.00 because double boot sector A 204 was not the sector that was written. The version code in the main sector 202 was updated from Ver1.00 to Ver1.01, however, and the version codes in double boot sector A 204 and main sector 202 therefore do not match.

When the version code in the double boot sector A 204 selected by the double boot program selection process thus does not match the version code in the main sector 202, step S504 in FIG. 5 causes the memory overwrite process controlled by the memory overwrite program stored in double boot sector A 204 to run in this embodiment of the invention. Because double boot sector B 203 is broken, both double boot sector B 203 and main sector 202 are overwritten by the memory overwrite program after the program stored in double boot sector A 204 starts.

By thus verifying whether the version codes match or do not match, this embodiment of the invention prevents proceeding directly to the normal operating mode even though only the main program was overwritten and writing the double boot program failed. In other words, this embodiment of the invention enables operation to proceed in the normal processing mode controlled by the main program only if both the double boot sector and the main sector 202 are successfully written. This prevents the user from continuing to use the printer believing that the software was correctly updated even though writing the double boot sector actually failed.

As described above, the main program runs in this embodiment of the invention only if the same version code is read from double boot sector A 204 and main sector 202 or from double boot sector B 203 and main sector 202 when the printer 1 power turns on or is reset. It is therefore possible when updating the printer 1 firmware to reliably confirm if both the main program and the boot program were successfully updated. In addition, whether the overwrite process succeeded or failed can be verified by the relatively simple method of verifying if the same version codes are stored in the main sector and either the first or second boot sector.

Furthermore, if writing the boot program to either double boot sector A 204 or double boot sector B 203 fails for some reason after running the boot selector program and only the main program was successfully written, the boot program for which writing failed can be simply written again. As a result, after the power turns on again and the boot program runs from the boot sector that was not overwritten and thus stores the old version code, the main program that was updated and is identified by the new version code will not run. This avoids the problem of the printer 1 boot program not being updated after the printer 1 is turned on again as a result of the failed overwrite process.

Because the main program update process runs again if writing the main program fails, this embodiment of the invention prevents a deficient main program from running and thus prevents the printer 1 from not operating correctly. Furthermore, if there is an error in double boot sector A 204 or double boot sector B 203, the printer 1 can still boot up using the boot program stored in the normal boot sector, and the main program can run after the printer 1 startup process ends.

A printer according to this embodiment of the invention can also always select and boot from the boot sector that stores the most recent software version and was correctly written. Furthermore, because the printer can start if either double boot sector A 204 or double boot sector B 203 is normal, the invention prevents the printer from being rendered unable to start up.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A data processing apparatus comprising:
   a CPU;
   a flash ROM that can communicate with the CPU and has a plurality of sectors, the flash ROM comprising:
      a boot selector sector that stores a boot selector program;
      a first boot sector storing a first boot program;
      a second boot sector storing a second boot program; and
      a main sector that stores a main program activated by a boot program selected from the group including the first boot program and the second boot program;
   the CPU executing the boot selector program to select a boot program from the group including the first boot program and the second boot program;
   the CPU comparing a version code of the selected boot program to a version code of the main program stored in the main sector; and
   the CPU executing the main program if the version code in the main sector matches the version code of the selected boot sector.

2. The apparatus according to claim 1, wherein a flash ROM write process is performed if the version code of the main program and the version code of the selected boot sector do not match.

3. A method for a data processing apparatus comprising a flash ROM having a boot sector that stores a boot selector program, a first and a second boot sector each storing a version code, and a main sector storing main program and a version code of the main program, the control method comprising the steps of:
   selecting a boot sector from the group including the first boot sector and the second boot sector by running the boot selector program;
   verifying the version code of the main program in the main sector matches the version code stored in the selected boot sector; and
   running the main program if the version code of the main program in the main sector matches the version code of the selected boot sector.

4. The method according to claim 3, further comprising performing a flash ROM write process if the version code of the main program and the version code of the selected boot sector do not match.

5. The method according to claim 3, further comprising:
   verifying a main sector checksum;
   wherein the main program is run if the version code of the main program matches the version code of the selected boot sector and the main sector checksum is correct.

6. The method according to claim 3, wherein the first boot sector and the second boot sector each store a data update count for comparing the age of content stored in the first boot sector and the second boot sector, and a checksum and a boot ID for verifying the integrity of boot programs stored in the first boot sector and the second boot sector.

7. The method according to claim 6, wherein selecting a boot sector comprises:
   verifying the checksum of each boot sector; and
   comparing the first boot sector update count to the second boot sector update count.

8. The method according to claim 7, wherein a boot program from the first boot sector executes if the first boot sector checksum and the second boot sector checksum are both correct, and the update count of the first boot sector is greater than the update count of the second boot sector; and
   a boot program from the second boot sector executes if the update count of the second boot sector is greater than the update count of the first boot sector.

* * * * *